Nov. 24, 1964  J. M. VAN NAME ETAL  3,158,224
TUBULAR STRUCTURES
Filed Oct. 9, 1961  2 Sheets-Sheet 1

INVENTORS
JOSEPH M. VAN NAME
GERALD A. ZIMMERMAN
BY
ATTORNEY

Nov. 24, 1964  J. M. VAN NAME ETAL  3,158,224

TUBULAR STRUCTURES

Filed Oct. 9, 1961  2 Sheets-Sheet 2

INVENTORS
JOSEPH M. VAN NAME
GERALD A. ZIMMERMAN
BY
ATTORNEY

United States Patent Office 3,158,224
Patented Nov. 24, 1964

3,158,224
TUBULAR STRUCTURES
Joseph M. Van Name, Blue Bell, and Gerald A. Zimmerman, Malvern, Pa., assignors to A. B. Chance Company, Centralia, Mo., a corporation of Missouri
Filed Oct. 9, 1961, Ser. No. 143,772
3 Claims. (Cl. 182—46)

This invention relates to tubular structures and desirably may be embodied in strong, light, durable electrically non-conductive ladders for utility linemen, maintenance workers or the like for obtaining access to elevated electrical equipment such as that located on utility poles or other structures, or may be utilized in the construction of the latter as in the erection of fixed lattice masts, towers, trusses or other supports, especially where strong, light, electrically non-conductive ones are desired.

There has long existed in the utilities industries need for a light-weight and hence readily portable ladder having structural strength adequate to afford physical safety to a worker supported upon it yet sufficiently non-conductive of electricity to avoid exposure to electrical shock conditions but it has been necessary to compromise the optimum properties in each of these categories and hence to accept deficiencies in respect to one or more because of the unavailability of a ladder in all respects adequate to meet the desired requirements.

Relatively fixed permanent structures particularly those used for supporting electrical conductors have likewise required compromise since it has been necessary in many instances in order to afford adequate strength that metal and hence conductive structural members be utilized necessitating the installation of sometimes large and expensive insulators for connection with the conductors, whereas when non-conductive members can be employed either for an entire structure or for a substantial portion of it the need for insulators is minimized.

It has been impractical, however, to build such structures from non-metallic and hence non-conductive tubular elements primarily because of the unavailability of means for satisfactorily uniting them in joints providing the requisite strength and it is therefore an object of the present invention to provide an improved joint for tubular elements whereby one such element, for example the rung of a ladder, may be permanently secured to another element such as the tubular side rail of the ladder without creating a zone of localized structural weakness at the juncture of the elements; like principles of course are utilized in the erection of fixed structures such as masts, towers and the like comprising non-metallic tubular structural elements for either the whole or a major part of the structure.

It is another object of our invention to provide a novel ladder which is light in weight, strong, electrically non-conductive and not subject to deterioration from exposure to influences causing relatively rapid deterioration of ladders presently in use.

A further object is to provide an improved structure composed entirely or principally of plastic materials, within which broad term glass is included.

Other objects, purposes and advantages of the invention will hereinafter more fully appear or be understood from the following description of certain embodiments of it illustrated in the accompanying drawings, in which.

Figure 1:
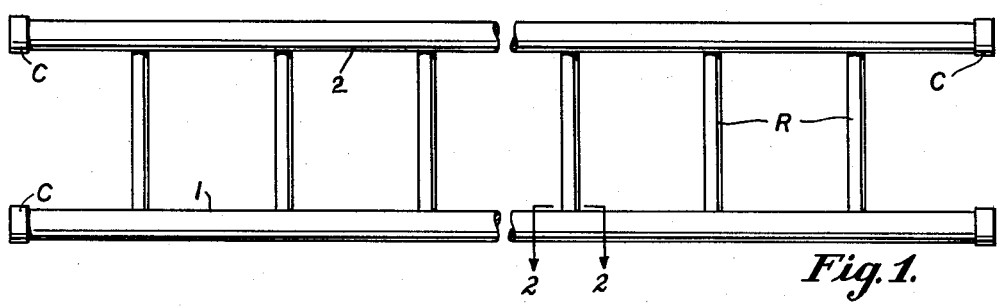
FIG. 1 is a fragmentary plan view of a ladder constructed in accordance with the invention.

Referring now more particularly to the drawings, the ladders therein represented will be recognized as typical examples of structures contemplated by the invention which, as heretofore noted, is directed to a joint for tubular non-metallic structural elements generally without regard to the specific nature or use of the structure of which the elements are components; said ladders therefore correspond in general to tubular ladders heretofore used having side rails 1, 2 between which rungs R extend with caps C of any suitable character at their ends.

The rails 1, 2 as well as the rungs, save for dimensional characteristics are of like construction; all are made from a composite tubular material produced by forming about a non-porous cellular plastic foam cylinder an epoxy resin impregnated fabric of glass fibers in which the latter preferably extend in alternate layers respectively parallel to the axis of the cylinder and circumferentially thereof, the resin thereafter being cured in a mold or otherwise to insure dimensional uniformity. This composite "tubing" as it will herein be termed is produced and marketed as "Epoxiglas" by A. B. Chance Co., of Centralia, Missouri, and is obtainable in colors corresponding to the color of the epoxy resin used in its manufacture; for electric utility outdoor maintenance ladders, we prefer to use the color "Omaha orange" to afford maximum visual detectability although color is of course a matter of choice.

In constructing a ladder of this material in accordance with our invention we customarily utilize for the rails two lengths of, say, 2½″ diameter in which the non-porous foam core is about 2⅛″ in diameter and the epoxy resin-glass fiber outer shell wall hence about 3/16″ thick. These pieces of length corresponding to that of the ladder to be made are transversely bored at suitable intervals appropriate to the desired spacing of the rungs to be supplied to form for reception of an end of each rung a hole 3 slightly larger than the rung diameter extending from one side of the rail through its outer shell 4 and foam core 5 but terminating at the inner wall of the shell at its opposite side and the core 5 is then cut out or otherwise enlarged as at 6 to a slightly larger diameter than the hole in the shell.

The rungs are formed from like composite tubing of smaller diameter, say, 1¼″ when 2½″ side rails are utilized, with the wall thickness of the exoxy resin-glass fiber outer shell correspondingly reduced to about 1/16″, and before they are inserted in the holes in rails 1, 2 are bored to remove the foam core inwardly from their ends for a distance somewhat greater than the diameter of the rails. Each cavity thus provided is then filled with a fluid or semi-fluid epoxy adhesive 7 which is next cured in any convenient way. A quantity of the same adhesive is then introduced into each hole in the rail before the rung is inserted therein so that as the parts are assembled some of the adhesive is forced out about the outer surface of the rung end to fill the surrounding void 6 and, preferably, at least a little of it is extruded through the hole 3 as at 8; hence when it has set or been cured the rung end is permanently united with the rail, the epoxy resin adhesive in effect becoming integral with the epoxy resin in the shells of the rail and rung thus constituting a solid mass of epoxy resin reinforced by the glass fibers of the shells. The supporting rails for the rungs are thus intimately bonded to the latter exteriorly of the solid masses which interiorly reinforce the rungs and extend axially in them at least in one direction beyond the rails, whereby maximum strength and impact resistance at the points where the rung ends are united with the rails is afforded and it is substantially impossible for a rung to be withdrawn from or to turn in either rail, the extruded mass 8 of epoxy resin providing after curing additional reinforcement to the joint.

The ladder consequently has at the junctures of rungs R with its side rails no points of localized weakness as is the case with most tubular ladders, but on the contrary points of perhaps greater strength than elsewhere; moreover the adhesive masses 7 at the rung ends effectually seal the rungs against infiltration of moisture, fungi or the like and inhibit access to the foam cores of the rungs of deleterious foreign matter. The adhesive seals 8 at holes 3 perform a like function for the side rail cores at these points while the tightly fitted caps C at the ends of the rails which may have hooks or other fittings secured to them if desired are designed to serve in the same way to protect the ends of the rail cores from such contamination.

There is thus provided an extremely strong, non-metallic ladder of maximum strength to weight ratio, tests having established that one may be constructed in accordance with the invention affording two or three times the bending strength of one of the same weight made of wood and comparing favorably with that of metal ladders of greater weight. The ladder is moreover resistant to weathering, corrosion and substantially every other factor tending to cause deterioration of metal and/or wood ladders while its light weight enables it to be handled readily and its electrical insulating properties provide maximum safety when used in the presence of electrical hazards. Furthermore the absence of splintering which is frequent in wood ladders eliminates the need for occasional refinishing to remove splinters, while sharp pointed and frequently dangerous projections often raised on the surface of metal ladders when in service cannot be duplicated in the ladders of our invention. Being impervious to moisture the latter are incapable of providing internal paths for conduction of electricity due to condensation of atmospheric moisture and this same property also affords maximum resistance to attack by fungi, bacteria or other micro-organisms, corrosion due to air- or waterborne chemical substances whether or not supplemented by electrolytic action, while the natural resilience of the materials employed combined with their strength permits the ladders to withstand severe usage over a long service life.

Figure 4:
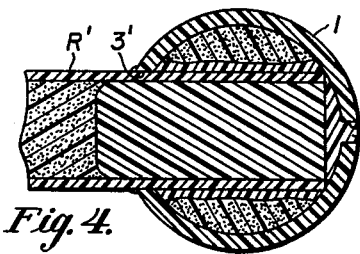
FIG. 4 is a view corresponding to FIG. 3 but showing a modified embodiment of the invention.

In the modified embodiments of the invention which have been mentioned like materials are empolyed for the side rails and rungs but they are treated in a somewhat different manner. Thus in the ladder of which but one rung-rail joint is illustrated in FIG. 4 a hole 10 coaxial with but smaller than each hole 3' in rail 1' is drilled in the rail shell and after the end of each rung R' has been inserted in its hole 3' epoxy resin adhesive 11 in liquid form is injected through hole 10 into the void around the rung to provide, after curing, a joint of substantially the same characteristics as that hitherto described, being substantially indistinguishable therefrom except for the absence of glass fiber reinforcement in the space previously defined by the relatively small hole 10 but since said space is filled with solidified epoxy resin adhesive the effect of this difference is negligible.

Figure 2:
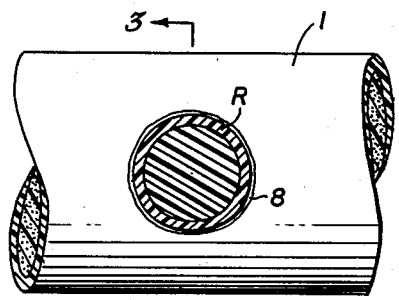
FIG. 2 is an enlarged fragmentary section thereof on the line 2—2 in FIG. 1.
Figure 3:
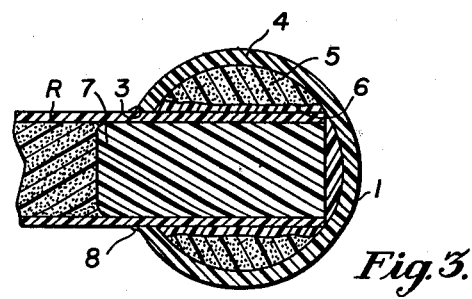
FIG. 3 is a fragmentary section on line 3—3 in FIG. 2.
Figure 5:
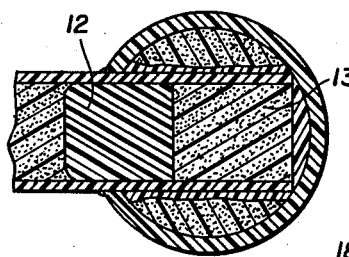
FIG. 5 is a similar view of another embodiment.

In the joint illustrated in FIG. 5 in order to minimize the amount of epoxy adhesive required and also to reduce somewhat the overall weight of the ladder the rung ends after portions of their cores have been removed as previously explained are only partially filled with adhesive 12 after which a plug 13 of plastic foam is inserted to substantially fill the remaining space and the joint with a rail is thereafter completed in accordance with either of the procedures above described, that of FIGS. 2 and 3 being used for the one illustrated.

When a ladder having double side rails is required we may employ generally rectangular blocks 15 of glass fiber-reinforced epoxy resin or other suitable materials such as wood or metal having parallel semicylindrical grooves 16, 17 for reception respectively of the tubular side rails 18, 19 which, except that they normally are of smaller diameter, are made of the same materials as the side rails of the ladders hereinbefore described. The rungs 20 for this ladder are also of like materials and preferably have the foam core removed from each end a distance somewhat greater than the thickness of blocks 15 and the resultant void filled with epoxy adhesive 21 which may be cured before the rung is inserted in the bore 22 provided for it in the block. This bore, which is slightly outwardly tapered toward the outer edge of the ladder, is of a size freely to receive the end of the rung with sufficient clearance to permit introduction of epoxy adhesive 23 in fluid state which after curing constitutes an integral bond between the rung and block and forms in effect a cylindrical wedge inhibiting axial movement between the parts under stress tending to withdraw or turn the rung. Like adhesive is used in grooves 16, 17 to bond the block in position between the side rails 18, 19, which are usually secured to suitable fittings at the ends (not shown) of the ladder and sealed in any appropriate way.

Figure 7:
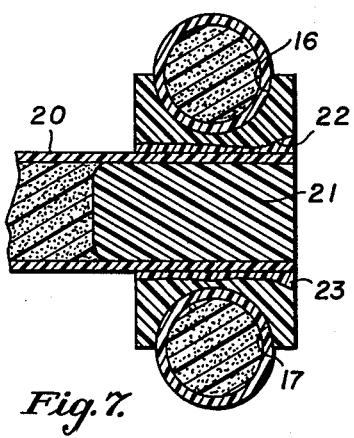
FIG. 7 is an enlarged fragmentary section on line 7—7 in FIG. 6.
Figure 6:
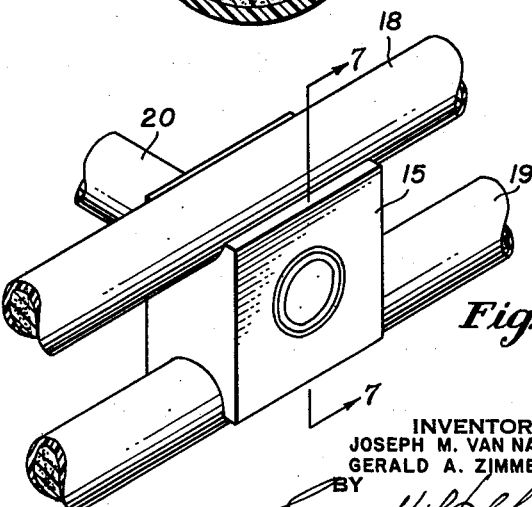
FIG. 6 is a fragmentary perspective view illustrating application of the principles of the invention to a ladder having double side rails.
Figure 8:
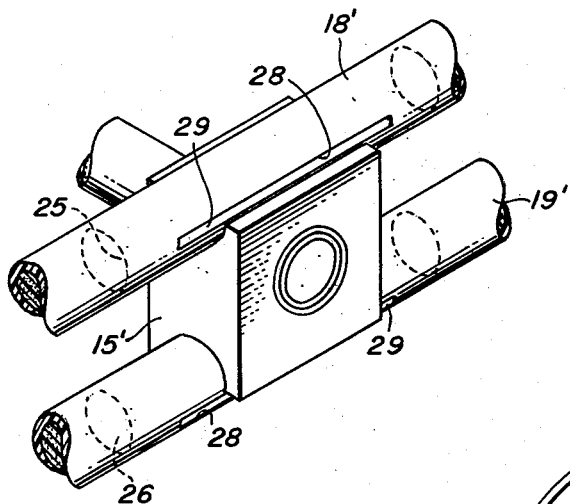
FIG. 8 is a fragmentary perspective corresponding to FIG. 6 but illustrating a somewhat modified embodiment in accordance with the invention.

FIG. 8 illustrates a modification of the ladder of FIGS. 6 and 7 which in all respects resembles the latter save that in the interest of additional strength its rails 18', 19' are provided with solid internal reinforcements 25, 26 at the zones adjacent the joints with the rungs. To this end the rail tubes are longitudinally slotted at 28 preferably in alignment with a neutral zone in respect to regions of maximum bending stress and the cellular core material removed from the areas to be aligned with block 15' and for a short distance therebeyond in each direction; the resultant void and the slot are then filled with epoxy resin adhesive 29 so that after curing a zone of substantially solid epoxy resin as distinguished from a tubular one containing cellular material is aligned with block 15' in each rail.

Figure 9:
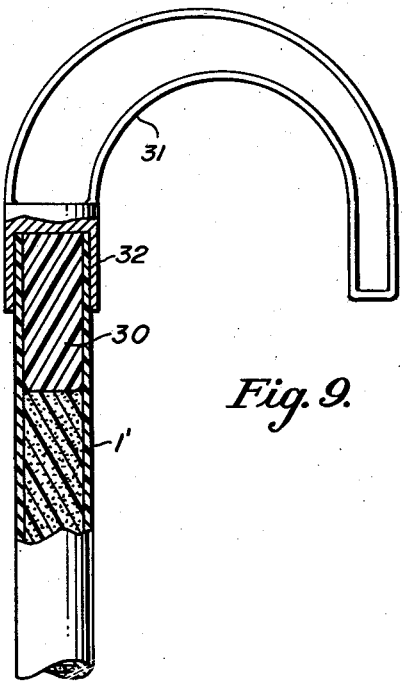
FIG. 9 is a fragmentary side view of a ladder rail, partly in longitudinal axial section, one end of which is equipped with a hook for engaging a support to suspend the ladder therefrom.

In scaling or so-called hook ladders hooks are provided at one end for engagement with a wall or the like and in accordance with our invention this may readily be accomplished by reaming one end of each rail, both being exemplified by rail 1' (FIG. 9) to remove the cellular filler material for a short distance and disposing epoxy resin adhesive 30 in the resulting void to provide after curing added strength at these points, following which a metal hook 31 having an integral sleeve 32 snugly receiving the end of the rail is secured to the latter by additional adhesive in lieu of cap C used on standard ladders; such caps usually do not require the rail ends be similarly reinforced, although it is obvious they can be if desired.

In the foregoing embodiments in each of which a solid reinforcement is formed by introducing fluid epoxy adhesive into a cavity, cellular material is cored out to produce the cavity in such manner as to leave a rounded edge at its bottom; the solidified adhesive automatically conforms to this shape whereby highly localized zones of stress at the joint when in service are minimized.

Figure 10:
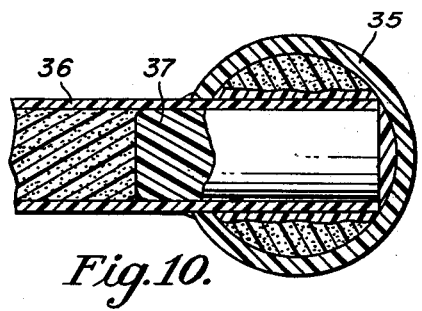
FIG. 10 is a fragmentary section generally corresponding to FIGS. 3–5 but showing another embodiment of the invention.
Figure 11:
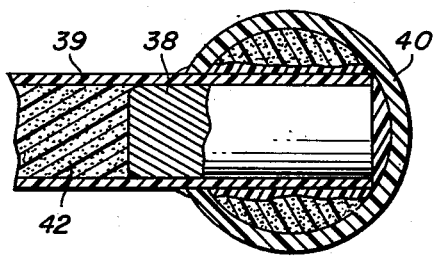
FIG. 11 is a similar view but illustrating a still further embodiment of it.

Further examples of tubular structural element joints constructed in accordance with the invention are illustrated in FIGS. 10 and 11 substantially corresponding to FIGS. 3-5 when used in a ladder like that shown in FIG. 1. The first of these examples (FIG. 10) shows a rail 35 in which a rung 36 is entered and secured in accordance with the procedure of any of FIGS. 3-5. In preparation for its insertion in the rail, however, it is reamed at its end and a cylindrical plug 37 of glass fiber reinforced solid plastic material of any suitable composition is entered into the rung with epoxy adhesive securing it intimately to the tubular component of the latter, while in FIG. 11 a metal plug 38 (which may be tubular) is disposed in like manner in rung 39 preparatory to its assembly with rail 40. Preferably the inner corners of plugs 37, 38 are rounded off slightly to eliminate a sharp transition zone between the reinforced part of the rung and the adjacent relatively non-reinforced part thereof occupied by cellular plastic 42 to conform to the corresponding rounding of corners in preceding joints.

As weight and cost considerations as well as attainment of adequate strength enter into the design of most joints embodying our invention they will usually determine the extent to which the tubular structural elements being joined are provided with internal reinforcements at zones of anticipated maximum shearing and other stresses, and whereas in the "single" rail ladders herein described and illustrated we have not heretofore suggested such reinforcements it will be obvious they can be used to whatever extent desired in the same manner as the reinforcements in the double rails of the ladder shown in FIG. 8, the provision of a solid mass of material, be it epoxy resin, glass fiber reinforced plug, metal plug or tube or other device replacing the relatively weak cellular component of the structural members at the zones of greatest need for reinforcement being a primary feature of the invention. It is not, however, intended to suggest that the cellular material normally occupying the tubes of glass fiber reinforced epoxy resin obtainable on the open market does not contribute any load resisting capacity, since its resistance to compression is a substantial factor in affording to the element as a whole great strength, particularly in resistance to bending or compression stresses, in relation to its weight.

We have herein shown and thus far mentioned only joints in which the axis of one of the structural elements joined extends at 90° to the axis of the other but it will be obvious that like principles may and usually will be employed in joints between elements otherwise disposed in relation to each other, such for example as those in lattice structures, trusses or the like meeting at other than 90° angles.

It will therefore be evident that our invention in each of the several embodiments described provides a structural joint for tubular elements of relatively light weight in consideration of its strength, formed of materials highly resistant to corrosion, decay or other chemical or biological deterioration; which is non-conductive of electricity, resistant to establishment of electric current-conductive paths through adherence, absorption, or accumulation of condensed atmospheric moisture, and is resilient under stress and capable of withstanding severe usage when subjected in service to stresses considerably in excess of those normally anticipated.

Moreover, while we have herein described with considerable particularity various embodiments of the invention and certain alternatives we have devised for providing maximum strength at the joints between structural members constructed from the aforesaid composite tubular materials whereby the relatively physically weak foam core is retained at points normally subjected to minimum stress and replaced by relatively dense material of maximum strength in zones of maximum stress, we do not desire to be thereby limited or confined thereto in any way as changes and modifications in the form, structure, arrangement and relationship of the several elements employed will occur to those skilled in the art and may be utilized if desired without departing from the spirit and scope of the invention as defined in the appended claims.

Having thus described our invention, we claim and desire to protect by Letters Patent of the United States:

1. A ladder comprising a rail having a tubular glass fiber reinforced plastic shell and a cellular plastic core within the shell, and a rung having a tubular glass fiber reinforced plastic shell enclosing a cellular plastic core, an end of the rung being entered in a hole in the shell of the rail and the shell of the rung being adhesively bonded to the shell of the rail, and reinforcing means within the rung comprising a solid mass of substantially incompressible material filling a length of the rung in a zone aligned with the hole in the shell of the rail and extending outwardly beyond said shell, said mass being adhesively bonded to the shell of the rung.

2. A composite supporting structure comprising in combination:
   (a) a rigid tubular element having a glass fiber reinforced plastic wall of substantial thickness and a relatively frangible cellular plastic core in its bore, said wall and core having a transverse hole extending from the inner surface of the element through the core and the opposed element wall,
   (b) a rigid tubular element of less diameter than the first element having a reinforced plastic wall of substantial thickness and a like cellular plastic core in its bore substantially throughout its length, said second element having an end projecting into the hole in said first element and core thereof with its cellular core interrupted in a zone aligned with the hole in the wall of the first element and a relatively solid incompressible mass disposed in said zone extending outwardly beyond the wall of the first element and adhesively secured in the bore of said second element proximate said zone, and
   (c) adhesive material uniting the elements of said zone.

3. A structure as defined in claim 2 in which the end of the second element engages the inner surface of the first element and is adhesively united thereto.

References Cited in the file of this patent

UNITED STATES PATENTS

| | | |
|---|---|---|
| 2,732,423 | Morrison | Jan. 24, 1956 |
| 2,862,650 | Scott | Dec. 2, 1958 |
| 2,870,793 | Bailey | Jan. 27, 1959 |
| 2,885,132 | Campbell | May 5, 1959 |
| 2,932,358 | Hopfeld | Apr. 2, 1960 |
| 2,982,373 | Hopfeld | May 2, 1961 |
| 3,009,532 | Richard | Nov. 21, 1961 |
| 3,042,140 | Basile | July 3, 1962 |

FOREIGN PATENTS

| | | |
|---|---|---|
| 17,561 | Great Britain | Aug. 30, 1899 |
| 657,746 | Great Britain | Sept. 26, 1962 |

UNITED STATES PATENT OFFICE
CERTIFICATE OF CORRECTION

Patent No. 3,158,224                         November 24, 1964

Joseph M. Van Name et al.

It is hereby certified that error appears in the above numbered patent requiring correction and that the said Letters Patent should read as corrected below.

Column 6, line 46, for "of" read -- at --.

Signed and sealed this 13th day of April 1965.

(SEAL)
Attest:

ERNEST W. SWIDER                        EDWARD J. BRENNER
Attesting Officer                         Commissioner of Patents